(12) United States Patent
Xu

(10) Patent No.: US 9,422,815 B2
(45) Date of Patent: Aug. 23, 2016

(54) GAS TURBINE ENGINE COMPONENT WITH COMPOUND CUSP COOLING CONFIGURATION

(75) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 1028 days.

(21) Appl. No.: 13/544,227

(22) Filed: Jul. 9, 2012

(65) Prior Publication Data

US 2013/0209236 A1  Aug. 15, 2013

Related U.S. Application Data

(60) Provisional application No. 61/599,350, filed on Feb. 15, 2012.

(51) Int. Cl.
*F01D 5/18* (2006.01)
*F01D 9/06* (2006.01)

(52) U.S. Cl.
CPC ............. *F01D 5/186* (2013.01); *F01D 9/065* (2013.01); *F05D 2240/81* (2013.01); *F05D 2250/70* (2013.01); *F05D 2250/71* (2013.01); *F05D 2260/202* (2013.01); *F23R 2900/03042* (2013.01); *Y02T 50/676* (2013.01)

(58) Field of Classification Search
CPC .......... F01D 5/186; F01D 5/187; F01D 9/06; F01D 25/12; F05D 2240/81; F05D 2260/202; F05D 2250/70; F05D 2250/71; F05D 2250/611; Y02T 50/676
USPC ................... 415/115; 416/96 R, 97 R, 193 A
See application file for complete search history.

(56) References Cited

U.S. PATENT DOCUMENTS

| 4,197,443 | A | 4/1980 | Sidenstick |
| 4,529,358 | A | 7/1985 | Papell |
| 4,622,821 | A | 11/1986 | Madden |
| 4,653,279 | A | 3/1987 | Reynolds |
| 4,653,983 | A | 3/1987 | Vehr |
| 4,672,727 | A | 6/1987 | Field |
| 4,684,323 | A | 8/1987 | Field |
| 4,700,544 | A | 10/1987 | Fucci |
| 4,738,588 | A | 4/1988 | Field |
| 5,062,768 | A | 11/1991 | Marriage |

(Continued)

FOREIGN PATENT DOCUMENTS

| EP | 1326007 A2 | 7/2003 |
| EP | 1609949 A1 | 12/2005 |

(Continued)

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Dwayne J White
*Assistant Examiner* — Danielle M Christensen
(74) *Attorney, Agent, or Firm* — Kinney & Lange, P.A.

(57) ABSTRACT

A component for a gas turbine engine including a gas path wall having a first surface and a second surface. A cooling hole extends through the gas path wall from an inlet in the first surface through a transition to an outlet in the second surface. Cusps are formed on the transition.

16 Claims, 10 Drawing Sheets

(56) References Cited

U.S. PATENT DOCUMENTS

| | | | |
|---|---|---|---|
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2008/0003096 A1 | 1/2008 | Kohli et al. |
| 2008/0057271 A1* | 3/2008 | Bunker | 428/137 |
| 2008/0145208 A1 | 6/2008 | Klasing et al. |
| 2009/0013695 A1 | 1/2009 | Dierberger et al. |
| 2009/0304499 A1 | 12/2009 | Strock et al. |
| 2010/0040459 A1* | 2/2010 | Ohkita | 415/177 |
| 2010/0068032 A1 | 3/2010 | Liang |
| 2010/0282721 A1 | 11/2010 | Bunker et al. |
| 2011/0097191 A1 | 4/2011 | Bunker |
| 2011/0123312 A1 | 5/2011 | Venkataramanan et al. |
| 2011/0185572 A1 | 8/2011 | Wei et al. |
| 2011/0293423 A1 | 12/2011 | Bunker et al. |
| 2011/0311369 A1 | 12/2011 | Ramachandran et al. |
| 2012/0051941 A1 | 3/2012 | Bunker |
| 2012/0167389 A1 | 7/2012 | Lacy et al. |
| 2013/0115103 A1* | 5/2013 | Dutta et al. | 416/97 R |

FOREIGN PATENT DOCUMENTS

| | | |
|---|---|---|
| EP | 2131108 | 12/2009 |
| WO | 2011118131 A1 | 9/2011 |

OTHER PUBLICATIONS

The International Search Report & Written Opinion mailed Jun. 3, 2013 for International Application No. PCT/US2013/025887.

European Patent Office, the extended European search report, Nov. 26, 2015, 8 pages.

Jack D. Mattingly, Elements of Gas Turbine Propulsion, 1996, pp. GE-1014.001-GE-1014.129, McGrawhill, Inc., United States.

Je-Chin Han et al., Gas Turbine Heat Transfer and Cooling Technology, 2000, pp. GE-1008.001-GE-1008.159, Taylor & Francis, New York.

Ronald S. Bunker, A Review of Shaped Hole Turbine Film-Cooling Technology, Journal of Heat Transfer, Apr. 2005, vol. 127, pp. GE-1010.001-GE1010.013.

John Eaton, Ph.D., In the United States Patent and Trademark Office before the Patent Trial and Appeal Board, Declaration of John Eaton PH. D., Jul. 9, 2012, pp. GE-1003.001-GE-1003.087, United States.

* cited by examiner

GAS TURBINE ENGINE COMPONENT WITH COMPOUND CUSP COOLING CONFIGURATION

CROSS REFERENCE TO RELATED APPLICATION

This application claims priority to U.S. Provisional Application No. 61/599,350, filed on Feb. 15, 2012, and entitled "Gas Turbine Engine Component with Compound Cusp Cooling Configuration," the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

This invention concerns a component for a gas turbine engine that includes a gas path wall having a first surface and a second surface. Cooling hole extends through the gas path wall from an inlet in the first surface through a transition to an outlet in the second surface. Cusps are formed on the transition.

Another embodiment of the present invention is a cooling system for a gas turbine engine component. The cooling system includes a flow path wall having a first surface exposed to cooling fluid and a second surface exposed to working fluid flow. A cooling hole extends through the flow path wall from an inlet in the first surface through a transition to an outlet in the second surface. A metering section extends from the inlet to the transition. At least two longitudinal cusps extend along the metering section from the inlet toward the transition. The longitudinal cusps divide the metering section into lobes. A diffusing section extends from the transition to the outlet.

DETAILED DESCRIPTION

Figure 1:
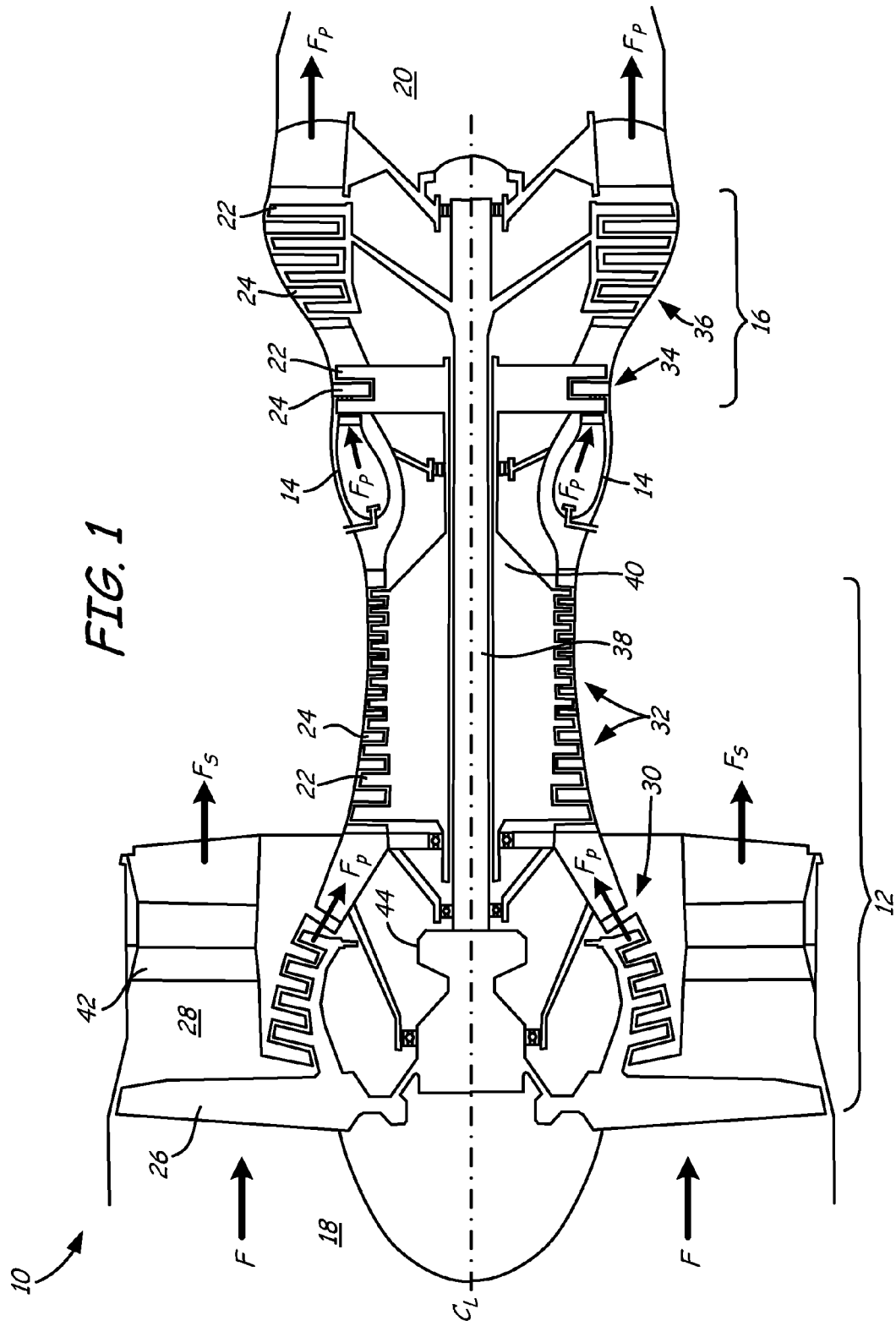
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
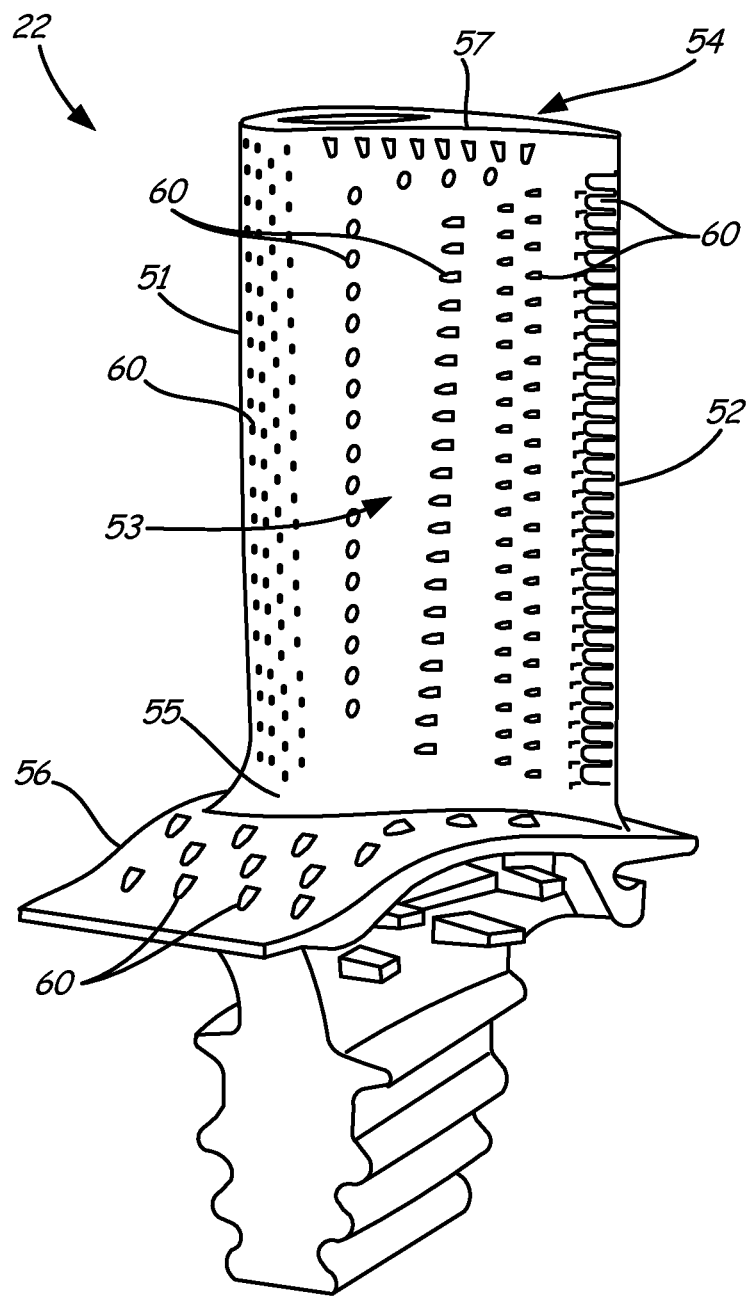
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
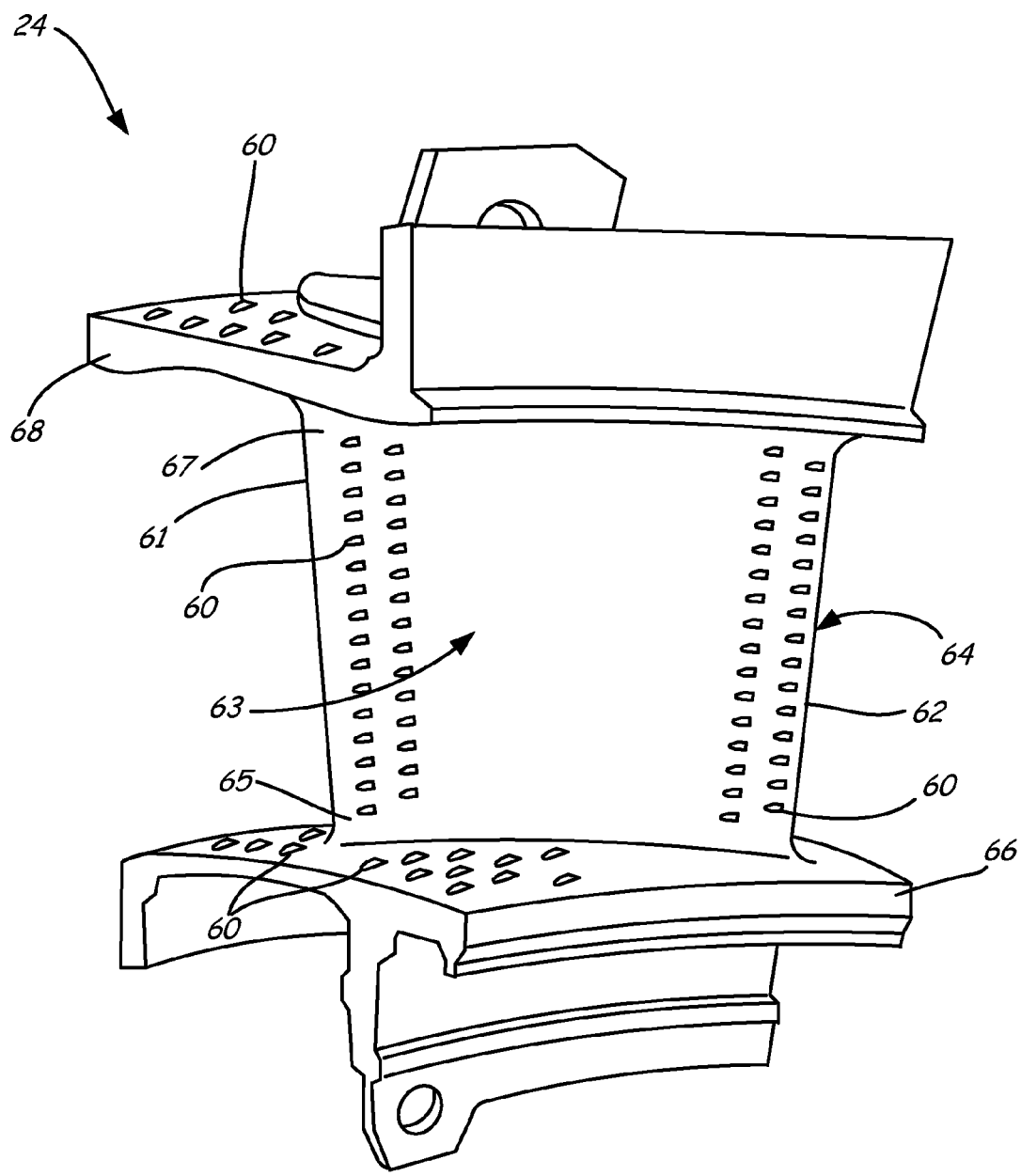
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

Figure 3A:
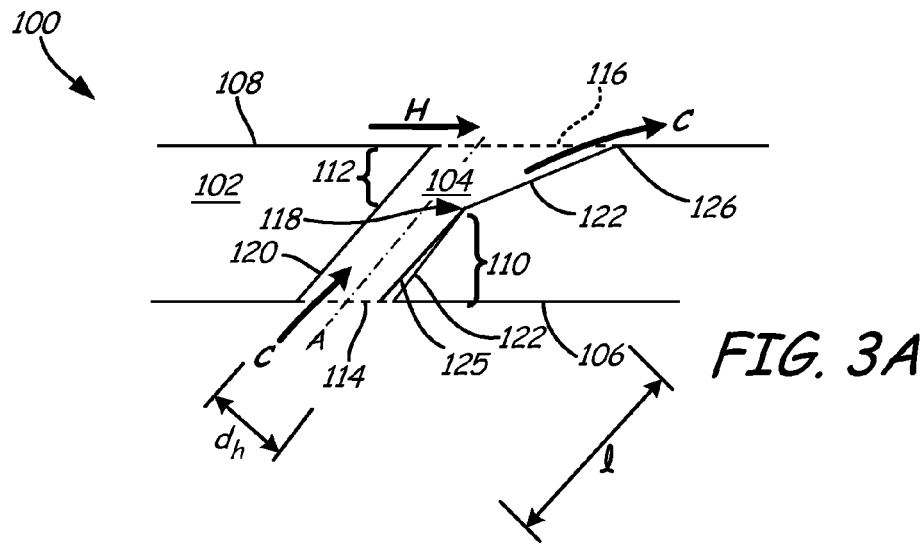
FIG. 3A is a cross-sectional view of a gas path wall for a gas turbine engine component, taken in a longitudinal direction.

FIG. 3A is a cross-sectional view of gas turbine engine component (turbine or turbomachinery component) 100 with gas path wall 102, taken in a longitudinal direction and that carries a cool first surface 106 and an opposite, hot, second surface 108. Cooling hole 104 extends through gas path wall 102 from first surface 106 to second surface 108 to form cooling hole 60 in the, for example outer wall of an airfoil, casing, combustor liner, exhaust nozzle or other gas turbine engine component, as described above.

Gas path wall 102 of component 100 is exposed to cooling fluid on first surface 106, with longitudinal hot gas or working fluid flow H along second surface 108. In some components, for example airfoils, first surface 106 is an inner surface and second surface 108 is an outer surface. In other components, for example combustor liners and exhaust nozzles, first surface 106 is an outer surface, and second surface 108 is an inner surface. More generally, the terms inner and outer are merely representative, and may be interchanged.

Cooling hole 104 delivers cooling fluid C from first surface 106 of wall 102 to second surface 108, for example to provide diffusive flow and film cooling. Cooling hole 104 is also inclined along axis A in a downstream direction, in order to improve cooling fluid coverage over second surface 108, with less separation and reduced flow mixing.

Axis A is an approximate longitudinal axis of flow of metering section 110. Cooling hole 104 includes metering section 110 and diffusing section 112, and extends along axis A from metering section 110 to diffusing section 112. Metering section 110 has inlet 114 at first surface 106 of gas path wall 102, and diffusing section 112 has outlet 116 at second surface 108 of gas path wall 102. Outlet 116 defines a perimeter of diffusing section 112 at an intersection of diffusing section 112 and second surface 108. Surfaces 120, 122, 130, and 132 of cooling hole 104 define cooling hole 104 between inlet 114 and outlet 116.

Transition 118 is defined in the region between metering section 110 and diffusing section 112, where cooling hole 104 becomes divergent (increasing flow area), and where the cooling fluid flow becomes diffusive. Transition 118 may be relatively abrupt, or may encompass an extended portion of cooling hole 104, for example in a flow transition region between metering section 110 and diffusing section 112, or over a region of overlap between metering section 110 and diffusing section 112.

As shown in FIG. 3A, metering section 110 of cooling hole 104 has substantially constant or decreasing cross-sectional area in the longitudinal direction, with upstream and downstream surfaces 120 and 122 converging or extending generally parallel to one another along axis A. This maintains or decreases the longitudinal dimension (along the direction of hot gas flow H) of cooling hole 104, from inlet 114 through metering section 110 to transition 118, in order to regulate the cooling fluid flow through inlet 114. Though surfaces 120 and 122 are represented in the cross-sectional view of FIG. 3A with a line, they can be curved as described further below. In the illustrated embodiment, surfaces 120 and 122 are angled with respect to both first surface 106 and second surface 108.

One or more cusps 125 extend longitudinally along metering section 110 of cooling hole 104, from inlet 114 toward transition 118. Cusps 125 projects laterally outward (toward axis A) from downstream surface 122 (or alternatively, from upstream surface 120) of cooling hole 104, discouraging lateral flow components to reduce swirl.

Diffusing section 112 of cooling hole 104 diverges between transition 118 and outlet 116. That is, upstream and downstream surfaces 120 and 122 diverge from one another in the longitudinal direction, in the region from transition 118 through diffusing section 112 to outlet 116. This increases the cross sectional flow area of diffusing section 112, in order to provide diffusive flow from transition 118 through diffusive section 112 to outlet 116. In the embodiment illustrated in FIG. 3A (also 4A and 4B), diffusing section 112 includes a single lobe 134. Lobe 134 is a surface of wall 102 which defines the void of cooling hole 104 at diffusing section 112. In alternative embodiments, such as FIGS. 5A, 5B, 6A and 6B, multiple lobes 134 can be included. In those embodiments, the multiple lobes 134 are surfaces of wall 102 which define distinct channel-like portions of the void of cooling hole 104 at diffusing section 112.

Metering section 110 has a length l and hydraulic diameter $d_h$, as measured across a cross section of metering section 110 which can be substantially circular except at cusps 125. Hydraulic diameters ($d_h$) are used to describe flow in non-circular channels. In some embodiments, metering section 110 has a length l according to the relationship: $d_h \leq l \leq 3\ d_h$. That is, the length of metering section 110 is between one and three times its hydraulic diameter. The length of metering section 110 can exceed 3 $d_h$, reaching upwards of 30 $d_h$.

Figure 3B:
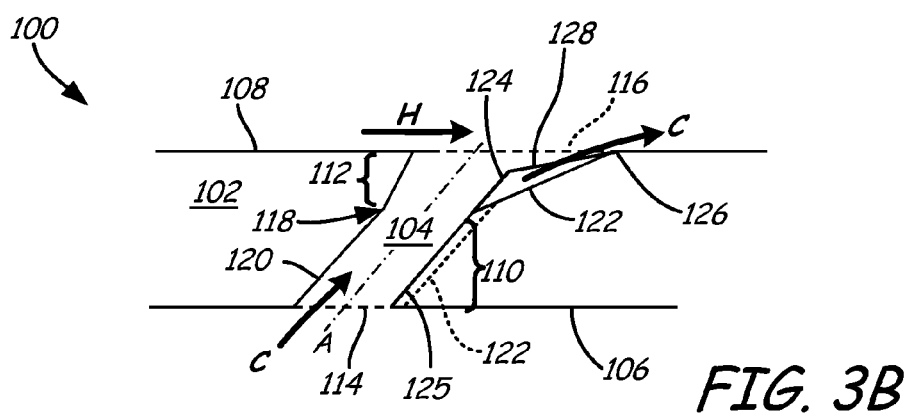
FIG. 3B is an alternate cross-sectional view of the gas path wall, showing the cooling hole in a lobed outlet configuration.

FIG. 3B is an alternate longitudinal cross-sectional view of gas turbine engine component 100 with gas path wall 102, showing cooling hole 104 in a lobed configuration. In this design, one or more longitudinal ridges 124 extend along downstream surface 122 of cooling hole 104, from transition 118 toward outlet 116.

Longitudinal ridges 124 project out from downstream surface 122 (alternatively, from upstream surface 120) toward axis A, discouraging vortex flow and dividing cooling hole 104 into lobes, in order to reduce swirl and mixing at outlet 116. In some designs, diffusing section 112 can include transition region 128. Transition region 128 can extend from longitudinal ridge 124 to trailing edge 126 of outlet 116, in order to discourage detachment and improve flow uniformity along second surface 108 of gas path wall 102, downstream of cooling hole 104 at outlet 116. Transition region 128 can be flat or planar. Alternatively, transition region 128 can be non-flat and non-planar, such as curved (e.g. convex) longitudinally and/or laterally to further encourage flow attachment.

Figure 3C:
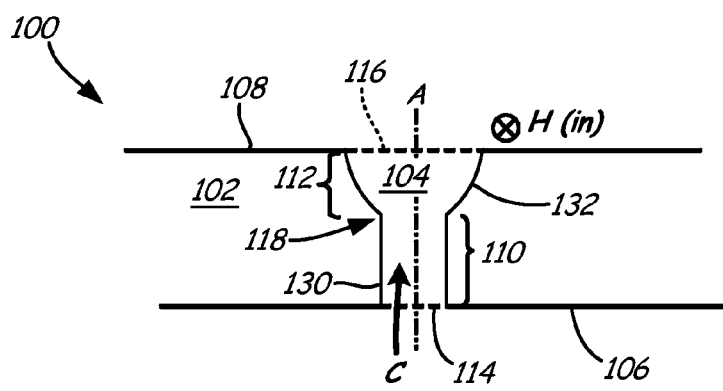
FIG. 3C is a cross-sectional view of the gas path wall, taken in a transverse direction.

FIG. 3C is a transverse cross sectional view of gas path wall 102, taken along axis A and looking in a downstream direction, in a plane perpendicular or transverse to the longitudinal cross sections of FIGS. 3A and 3B. In this downstream view, hot gas flow H is directed into the page, and lateral side surfaces 130 and 132 are separated in the transverse direction across axis A, perpendicular to hot gas flow H.

As shown in the FIG. 3C, metering section 110 of cooling hole 104 has substantially constant or decreasing cross sectional flow area. Opposing side surfaces 130 and 132 converge or extend generally parallel to one another along axis A in this region, from inlet 114 to transition 118. Thus, metering section 110 acts to restrict or meter cooling fluid flow from inlet 114 through transition 118, improving efficiency by regulating the amount of cooling fluid delivered to diffusing section 112.

In diffusing section 112, side surfaces 130 and 132 diverge laterally from one another (and from axis A), in the region from transition 118 to outlet 116. Thus, diffusing section 112 is divergent in both the longitudinal direction of FIGS. 3A and 3B, and in the transverse direction of FIG. 3C. This improves diffusive flow between transition 118 and outlet 116, decreasing flow separation at trailing edge 126 and improving cooling performance along second surface 108 of gas path wall 102. In the illustrated embodiment, side surfaces 130 and 132 are substantially perpendicular with respect to first surface 106 at their respective intersections with first surface 106 and are angled with respect to second surface 108 at their respective intersections with second surface 108.

Figure 4A:
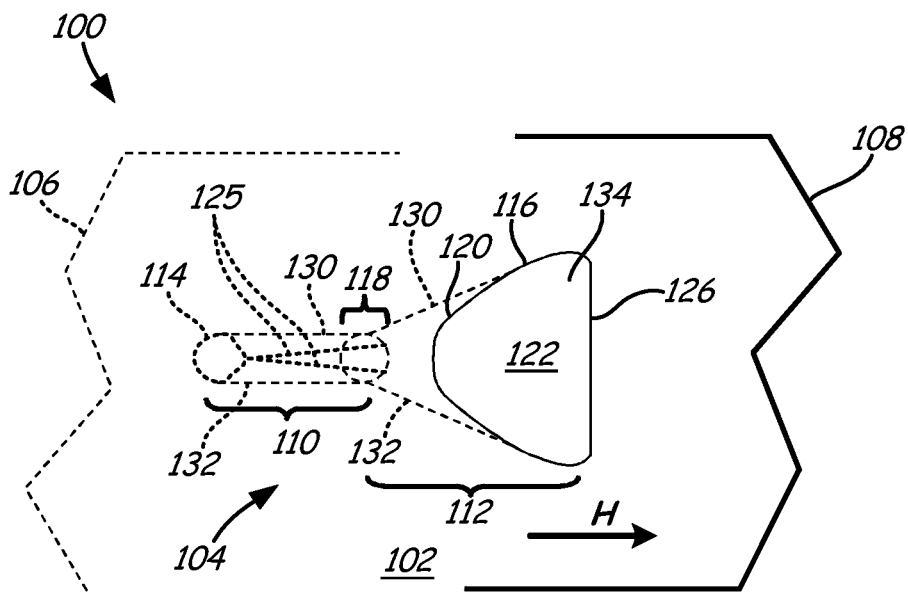
FIG. 4A is a schematic view of the gas path wall, illustrating the compound cusp geometry of the cooling hole inlet.

FIG. 4A is a schematic view of gas path wall 102, illustrating the compound cusp geometry of cooling hole 104 in metering section 110. This is a downward or inward view, looking down on second surface 108 of gas path wall 102, and along cooling hole 104 from outlet 116 toward transition 118 and inlet 114. Cusps 125 are presented at the downstream perimeter of inlet 114, extending along metering section 110 of cooling hole 104 from inlet 114 toward transition 118. Inlet 114 has a substantially curved shape that comes to inwardly-projecting points at cusps 125. Inlet 114 can be described as approximately oval shaped, except that cusps 125 create pointed projections at the downstream perimeter of inlet 114. Similarly, metering section 110 is approximately cylindroid-shaped (e.g. an elliptic cylinder), except that cusps 125 creates inward-projecting ridges at a downstream side of metering section 110.

In the particular configuration of FIG. 4A, two cusps 125 extend from inlet 114 to termination points at (circular or oval) transition 118. In some configurations, cusps 125 converge to a common termination point, as shown in FIG. 4A. In the illustrated embodiment of FIG. 4A, cusps 125 extend from a single termination point on inlet 114 and spread apart to intersect transition 118 at two termination points. In alternative embodiments, cusps 125 can extend from a single termination point on transition 118 and spread apart to intersect inlet 114 at two termination points (see, for example, FIG. 5A. In further alternative embodiments, cusps 125 can intersect inlet 114 at two termination points and intersect transition 118 at two termination points (see, for example, FIGS. 4B, 5B, 5C, 6A, and 6B).

Second surface 108 of gas path wall 102 is exposed to hot gas flow H in a longitudinal and downstream direction, from left to right in FIG. 4A. Cooling hole 104 extends down through gas path wall 102, from outlet 116 at second surface 108 (solid lines) through transition 118 to inlet 114 at first surface 106 (dashed lines). Conversely, metering section 110 of cooling hole 104 extends upward from inlet 114 to transition 118, and diffusing section 112 extends upward from transition 118 to outlet 116.

The size, length and other geometric properties of cusps 125 are selected to discourage swirl (vortex) flow, for example by introducing canceling vortex pairs into the cooling fluid to weaken kidney-shaped vortices formed by crossflow.

Cooling hole 104 can have a substantially constant width or can converge (narrow) along metering section 110, with side surfaces 130 and 132 converging in the lateral direction from inlet 114 to transition 118. Cooling hole 104 diverges (widens) along diffusive portion 112, with side surfaces 130 and 132 diverging from transition 118 to outlet 116. This configuration provides regulated flow from inlet 114 through metering section 110 to transition 118, and diffusive flow from transition 118 through diffusing section 112 to outlet 116, for more uniform coverage with less detachment along second surface 108 of gas path wall 102.

The configuration of outlet 116 is also selected to improve cooling performance. As shown in FIG. 4A, for example, outlet 116 is formed as a delta, with arcuate upstream surface 120 extending toward substantially linear trailing edge 126, transverse or perpendicular to hot gas flow H, in order to reduce separation along second surface 108 of gas path wall 102. Cusps 125 terminate at transition 118, and diffusing section 112 is defined as a single undivided lobe 134 between transition 118 and outlet 116. Alternatively, trailing edge 126 can be convex.

Figure 4B:
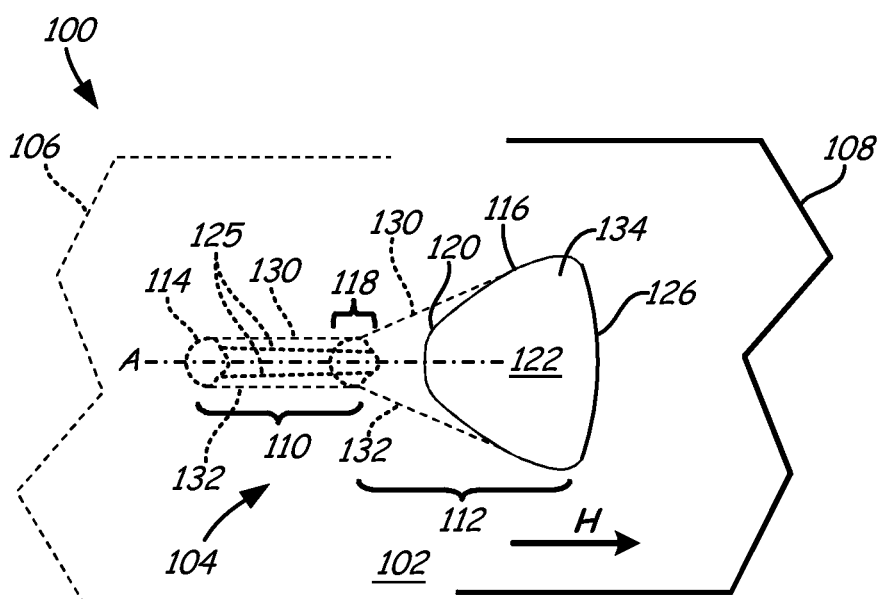
FIG. 4B is a schematic view of the gas path wall, illustrating an alternate inlet geometry.

FIG. 4B is a schematic view of gas path wall 102, illustrating an alternate geometry for metering section 110 of cooling hole 104. In this configuration, two cusps 125 extend from inlet 114 through metering section 110 to transition 118, as described above for FIG. 4A. Here, however, cusps 125 extend to distinct termination points on transition 118, and both inlet 114 and transition 118 have a compound cusp configuration, as defined by the cross section taken perpendicular to axis A of cooling hole 104 (see, e.g., FIGS. 7A, 7B and 7C, below).

Metering section 112 of cooling hole 104 extends as a single lobe 134 from compound cusp transition 118 to outlet 116. Outlet 116 has a delta geometry, as described above, with convex trailing edge 126.

Figure 5A:
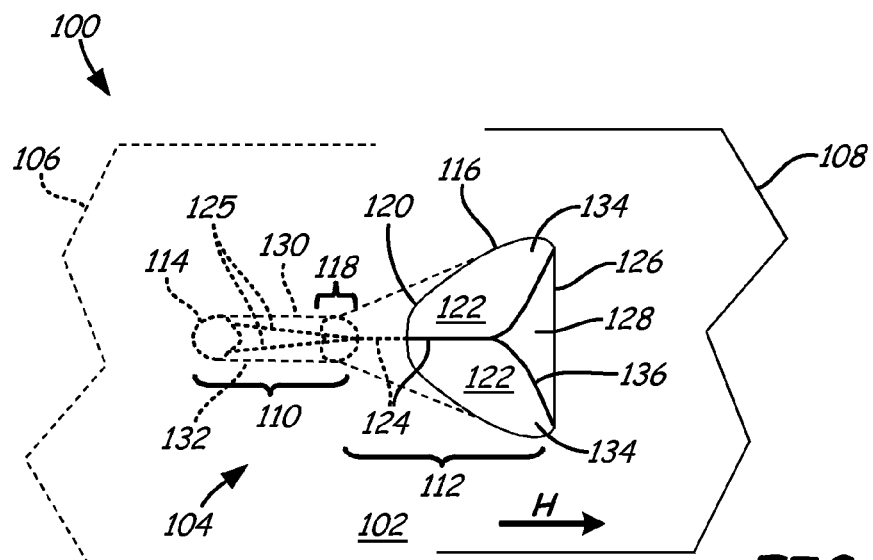
FIG. 5A is a schematic view of the gas path wall, illustrating a two-lobe geometry for the cooling hole outlet.

FIG. 5A is a schematic view of gas path wall 102, illustrating a two-lobe configuration for cooling hole 104 in diffusing section 112. As shown in FIG. 5A, two cusps 125 extend from inlet 114 along metering section 110 of cooling hole 104, converging to a single cusp 125 at transition 118 (see FIG. 7D).

Longitudinal ridge 124 extends from cusp 125 at transition 118, forming a single longitudinal ridge 124 along diffusing section 112, from transition 118 to outlet 116. Longitudinal ridge 124 separates cooling hole 104 into two lobes 134, as shown in FIG. 5A. Lobes 134 extend longitudinally along diffusing section 112, from transition 118 toward trailing edge 126 of outlet 116. Thus, lobes 134 define distinct channel-like portions of the void of cooling hole 104 at diffusing section 112.

Lobes 134 typically have arcuate or curved surfaces along downstream surface 122 of diffusing section 112, forming longitudinal ridge 124 as a cusped ridge along the boundary between adjacent lobes 134, similar to cusp 125 as described above. As shown in FIG. 5A, moreover, longitudinal ridge 124 is aligned with and extends congruently from one or more cusps 125 at transition 118, with substantially similar geometry extending from transition 118 toward outlet 116, along downstream surface 122 of cooling hole 104.

The particular geometries of individual divider processes 124 and cusps 125 may also vary. For example, one or more longitudinal ridges 124 and cusps 125 may be formed as long, narrow features extending along a surface of cooling hole 104, where two sloping sides of lobes 134 meet, or as a narrow raised band or rib structure along (any) surface 120, 122, 130 or 132 of cooling hole 104. Longitudinal ridges 124 and cusps 125 may also be either pointed or rounded, for example where adjacent arcuate lobes 134 meet, or where the direction of curvature reverses along a surface of cooling hole 104. Longitudinal ridges 124 and cusps 125 may also be formed as arched or cone-shape features, extending along the boundary of adjacent lobes 134.

Transition region 128 extends laterally between arcuate extensions 136 of longitudinal ridges 124, where arcuate extensions 136 are defined along the boundaries with adjacent lobes 134. As shown in FIG. 5A, for example, longitudinal ridge 124 splits or bifurcates into two arcuate extensions 136, which extend longitudinally and transversely along diffusing section 112 to trailing edge 126 of outlet 116. In this particular configuration, cooling hole 104 has a single transition region 128, extending along substantially the entire (transverse) width of trailing edge 126. Transition region 128 can be flat or planar. Alternatively, transition region 128 can be non-flat and non-planar, such as curved (e.g. convex).

Figure 5B:
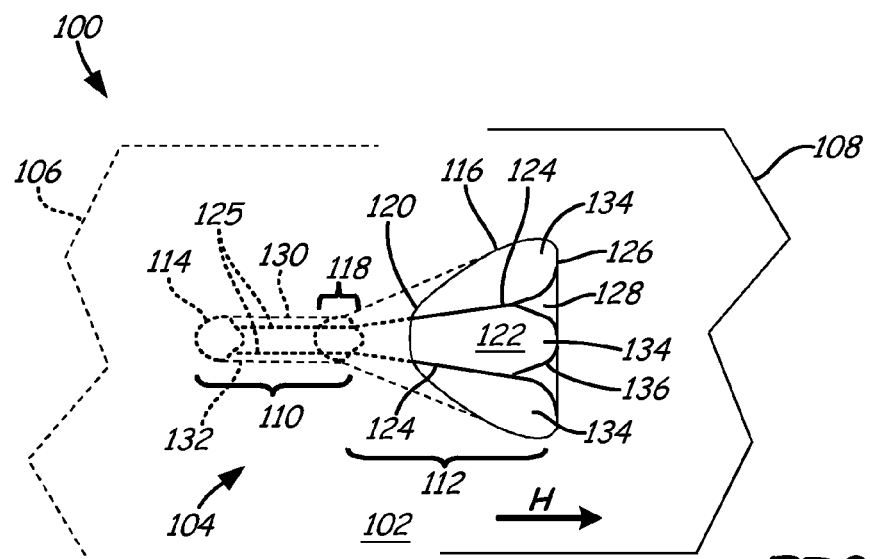
FIG. 5B is a schematic view of the gas path wall, illustrating a three-lobe outlet geometry.

FIG. 5B is a schematic view of gas path wall 102, illustrating a three lobe configuration for cooling hole 104 in diffusing section 112. In this configuration, two cusps 125 extend from inlet 114 to (bicuspid) transition 118 (FIGS. 7A, 7B, 7C), and two longitudinal ridges 124 extend from cusps 125 on transition 118 toward outlet 116, dividing cooling hole 104 into three lobes 134.

Two transition regions 128 extend from longitudinal ridges 124 to trailing edge 126 of outlet 116, between adjacent lobes 134. The mutual boundaries of transition regions 128 and adjacent lobes 134 are defined along arcuate extensions 136, as described above. Transition regions 128 extend across substantially all of trailing edge 126, eliminating irregularities to provide more uniform flow coverage and better cooling performance along second surface 108 of gas path wall 102, downstream of outlet 116.

Figure 5C:
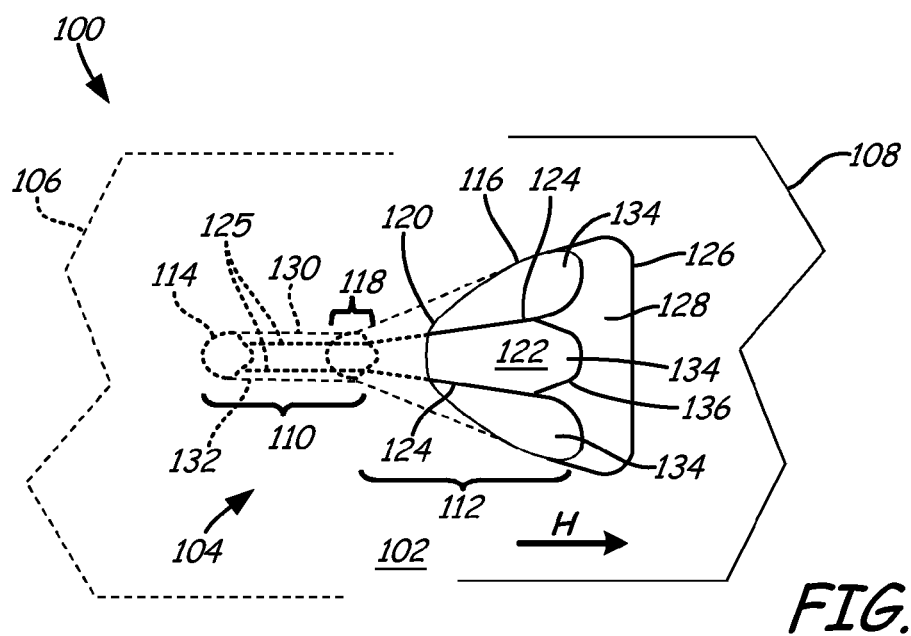
FIG. 5C is a schematic view of the gas path wall, illustrating a three-lobe outlet geometry.

FIG. 5C is a schematic view of gas path wall 102, illustrating a three lobe configuration for cooling hole 104 in diffusing section 112. In this configuration, two cusps 125 extend from inlet 114 to (bicuspid) transition 118 (FIGS. 7A, 7B, 7C), and two longitudinal ridges 124 extend from cusps 125 on transition 118 toward outlet 116, dividing cooling hole 104 into three lobes 134.

A single transition region 128 extends from longitudinal ridges 124 to trailing edge 126 of outlet 116. The boundary of transition region 128 and adjacent lobes 134 are defined along arcuate extensions 136. Transition region 128 extends across substantially all of trailing edge 126, eliminating irregularities to provide more uniform flow coverage and better cooling performance along second surface 108 of gas path wall 102, downstream of outlet 116. Transition region 128 separates lobes 134 from trailing edge 126 of outlet 116. A single transition region 128 can also eliminate sharp corners and thus reduces thermal mechanical fatigues.

Figure 6A:
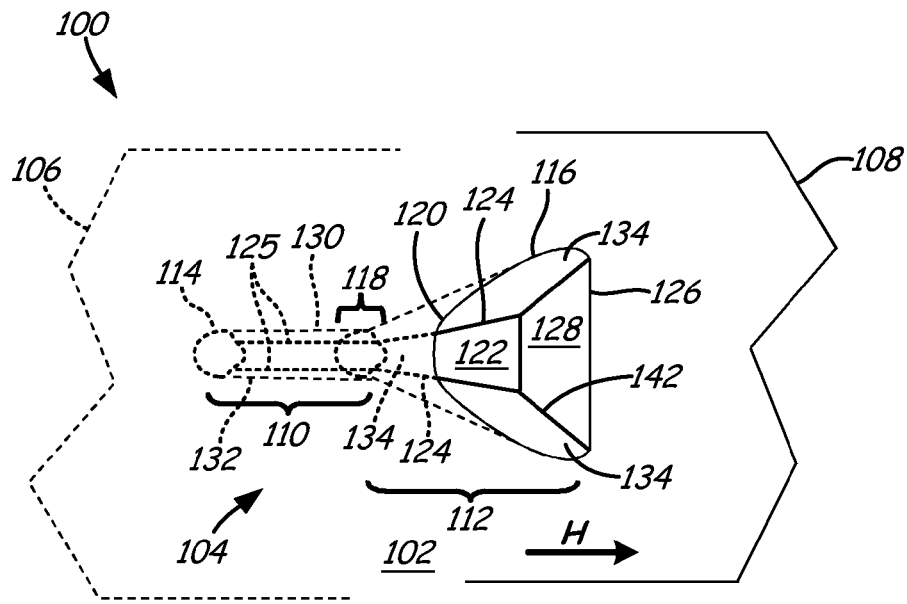
FIG. 6A is a schematic view of the gas path wall, illustrating a buried ridge outlet geometry.

FIG. 6A is a schematic view of gas turbine engine component 100 with gas path wall 102, illustrating a buried divider or buried ridge configuration for cooling hole 104. In this design, two cusps 125 extend from inlet 114 to (bicuspid) transition 118, and two longitudinal ridges 124 extend from cusps 125 on transition 118 toward outlet 116. Longitudinal ridges 124 divide diffusing section 112 of cooling hole 104 into three lobes 134, as described above for FIG. 5B. Here, however, ridges 124 and middle lobe 134 of diffusing section 112 terminate at transition region 128. Between the termination of longitudinal ridges 124 and trailing edge 126 of outlet 116, transition region 128 is bounded between intersections 142 with outer lobes 134.

Unlike arcuate extensions 136, intersections 142 do not extend above downstream surface 122 toward axis A of cooling hole 104. Instead, transition region 128 is defined along downstream surface 122, and adjacent lobes 134 curve up from intersections 142 toward second (upper) surface 108 of gas path wall 102. Transition region 128 extends across substantially all of trailing edge 126, eliminating irregularities for more uniform flow.

Figure 6B:
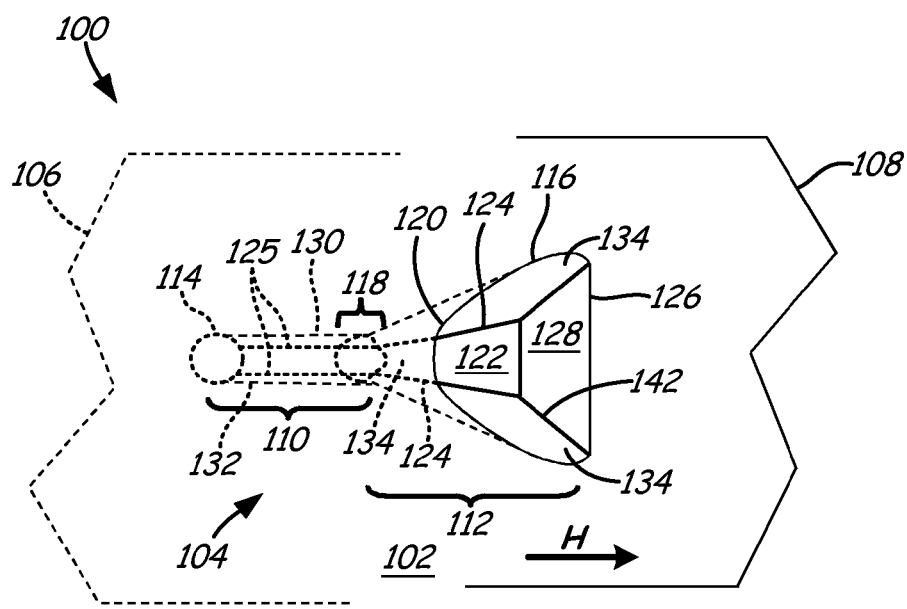
FIG. 6B is a schematic view of the gas path wall, illustrating.

FIG. 6B is a schematic view of gas turbine engine component 100 with gas path wall 102, illustrating a buried divider or buried ridge configuration for cooling hole 104. In this design, two cusps 125 extend from transition 118 through metering section 110 to a termination point at inlet 114. Cusps 125 taper from transition 118 to inlet 114. Thus, transition 118 has a cusped (bicuspid) configuration, as defined by a cross section taken perpendicular to the axis of cooling hole 104, but inlet 114 has an oval or circular (not cusped or uncusped) geometry.

The overall geometry of cooling hole 104 thus varies, as described above, and as shown in the figures. The design of inlet 114 and outlet 116 may also vary, including various circular, oblate, oval, trapezoidal, triangular, cusped, and delta shaped profiles with arcuate or piecewise linear upstream surfaces 120 and straight or convex trailing edges 126. The configuration of cooling hole 104 is not limited to these particular examples, moreover, but also encompasses different combinations of the various features that are shown, including metering sections 110 with a variety of different cusps 125, transitions 118 with circular, elliptical, oblong single cusp and bicuspid cross sections, and diffusing sections 112 with one, two, three or more lobes 134, in combination with various longitudinal ridges 124 and transition regions 128 as defined between arcuate extensions 136, intersections 142 or a combination thereof.

Figure 7A:
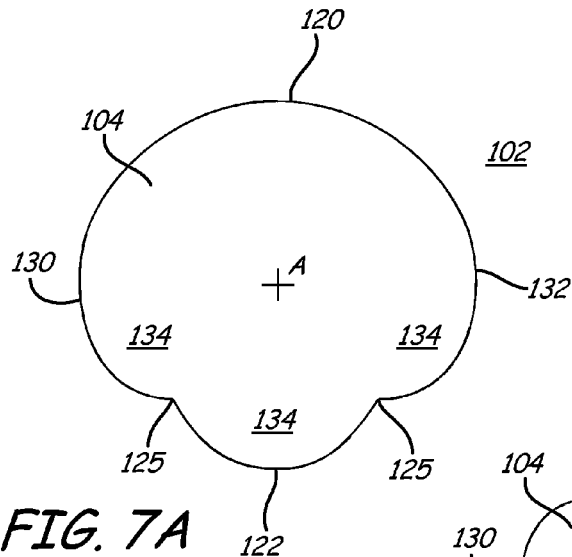
FIG. 7A is a cross-sectional view of the cooling hole, illustrating the compound cusp geometry.

FIG. 7A is a cross-sectional view of cooling hole 104 in flow path wall 102, illustrating the compound geometry of cusps 125. Cooling hole 104 is formed along axis A, extending longitudinally between upstream surface 120 and downstream surface 122, and laterally between opposing side surfaces 130 and 132. The cross section is taken anywhere from inlet 114 through metering section 110 to (and including) transition 118, in a plane perpendicular to axis A; that is, transverse to the direction of cooling fluid flow through cooling hole 104.

As shown in FIG. 7A, cooling hole 104 has a compound lobe or bicuspid geometry, with two separate cusps 125 dividing cooling hole 104 into three adjacent lobes 134. The cross section may be taken, for example, at inlet 114 as shown in FIG. 4A, 4B, 5A, 5B or 6, at transition 118 as shown in FIGS. 4B, 5B and 6, or anywhere along metering section 110 between inlet 114 and transition 118.

In the particular configuration of FIG. 7A, cusps 125 are formed along downstream surface 122 of cooling hole 104, between adjacent lobes 134, for example when adjacent lobes 134 are machined into or through flow path wall 102. The downstream orientation of surface 122 is defined with respect to working fluid flow along the hot (inner or outer) surface of flow path wall 102, as described above.

Alternatively, one or more cusps 125 may be formed along upstream surface 120, downstream surface 122, side surfaces 130 and 132, or a combination thereof. In addition, the designations of surfaces 120, 122, 130 and 132 may vary from application, either with to respect to the hot gas flow direction, or based on a different upstream, downstream, lateral or circumferential orientation of cooling hole 104 along axis A.

Figure 7C:
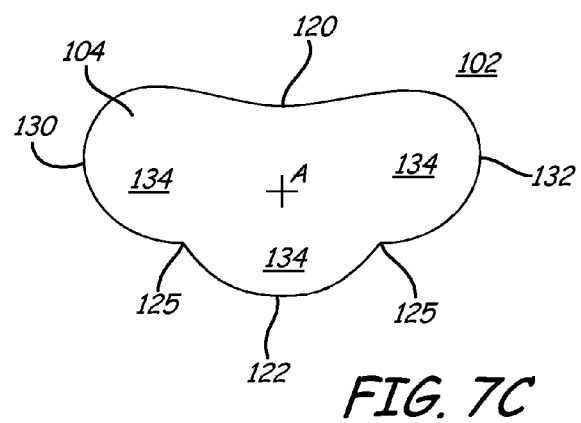
FIG. 7C is a cross-sectional view of the cooling hole, illustrating a crescent geometry.
Figure 7B:
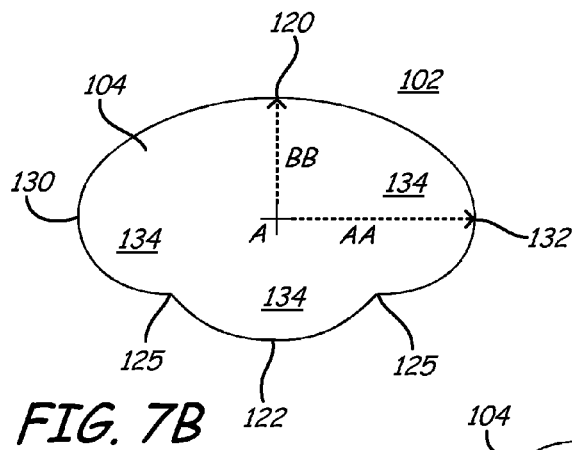
FIG. 7B is a cross-sectional view of the cooling hole, illustrating an oblate geometry.

FIG. 7B is a cross-sectional view of cooling hole 104 in flow path wall 102, illustrating an oblate geometry. In this configuration, cusps 125 divide cooling hole 104 into adjacent lobes 134, as described above, with the cross section taken anywhere along cooling hole 104 from inlet 114 through metering section 110 to transition 118.

As shown in FIG. 7B, however, the cross section of cooling hole 104 is more oblate or oval, as compared to the rounder or more cylindrical geometry of FIG. 7A. In particular, cooling hole 104 has a ratio of semi-major axis AA to semi-minor axis BB greater than 1.5:1, for example about 2:1 or more, as compared to a similar ratio of 1.5:1 or less for the corresponding cross section of FIG. 7A, for example about 1:1. In the embodiments of both FIG. 7A and FIG. 7B, cooling hole 104 can have a ratio of semi-major axis AA to semi-minor axis BB less than 3:1.

FIG. 7C is a cross-sectional view of the cooling hole 104 in flow path wall 102, illustrating a crescent or concave geometry. In this configuration, cusps 125 divide cooling hole 104 into adjacent lobes 134, as described above, but upstream surface 120 has a concave configuration, extending inward toward axis A between opposing side surfaces 130 and 132. This concave or crescent configuration further reduces the area of cooling hole 104 for improved metering, and provides separation between cooling fluid flow in adjacent lobes 134 to discourage swirl.

Figure 7D:
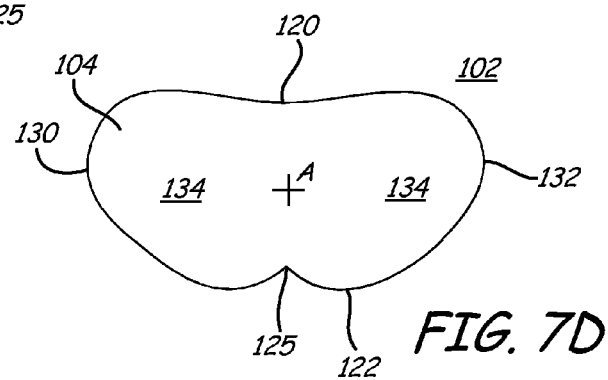
FIG. 7D is a cross-sectional view of the cooling hole, illustrating a single cusp geometry.

FIG. 7D is a cross-sectional view of cooling hole 104 in flow path wall 102, illustrating a single cusp, two-lobe configuration. In this configuration, a single cusp 125 divides cooling hole 104 into two lobes 134, for example as described for transition 118 in FIGS. 4A and 5A, above. Alternatively, the transition may have an uncusped or circumferentially convex cross section with a continuously convex (or non-concave) perimeter, for example a round or oval cross section, as shown in FIG. 4A, or delta-shaped cross section, as shown for outlet 116 of FIGS. 4A and 4B, with either a convex or substantially straight downstream surface 122.

Thus, the cross sectional geometry of cooling hole 104 also varies in the inlet portion, as shown in the figures and as described above, extending from the inlet through the metering section to the transition region. Moreover, the geometry may vary along a particular cooling hole, for example from a rounded cusped (or bicuspid) shape to a more oblate or crescent shape, or to a single-cusp shape where one or more cusps 125 merge, or to an oval or round cross sectional shape where one or more cusps 125 terminate. In some designs, the cross section of the diffusing section may also vary according to one or more of FIGS. 7A, 7B, 7C and 7D, for example as defined along one or more cusp-shaped ridges extending along the diffusing section from the transition, or extending to a delta-shaped configuration at the outlet, as described above.

Figure 8:
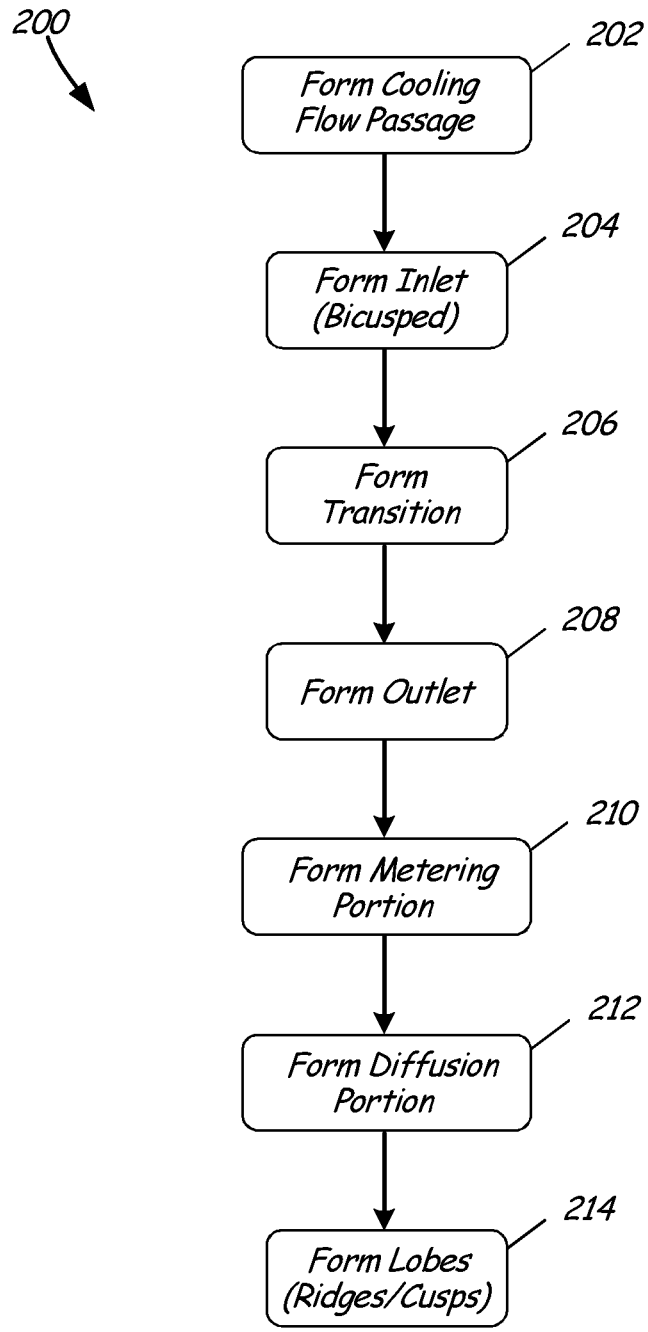
FIG. 8 is a block diagram illustrating a method for forming a cooling hole in a gas turbine engine component.

FIG. 8 is a block diagram illustrating method 200 for forming a cooling hole through the gas path wall of a gas turbine engine component. For example, method 200 may be used to form cooling hole 60 or cooling hole 104 in an airfoil, casing, liner, combustor, augmentor or turbine exhaust component, as described above.

Method 200 includes forming a cooling hole in the gas path wall (step 202), for example by forming a bicuspid inlet (step 204), forming a transition (step 206) and forming an outlet (step 208). Method 200 may also include forming a metering section (step 210) extending from the inlet to the transition, forming a diffusing section (step 212) extending from the transition to the outlet, and forming ridges to divide the diffusing section into lobes (step 214).

Forming an inlet (step 204) includes forming cusps on the inlet, for example two or more cusp, where the cusps extend along the metering section from the inlet toward the transition. One or more cusps may merge or terminate at the transition, and one or more cusps may extend past the transition along a ridge feature.

The cusp and ridge features divide the cooling hole into longitudinally extending lobes (step 214). In some configurations, one or more longitudinal ridges are defined as cusps in the inlet or metering section, and aligned with one or more congruent or co-extending longitudinal ridges in the outlet or diffusing section. The ridge and cusp structures may thus have similar geometry, and be aligned at the transition, extending congruently from one another along the metering section to the inlet, and along the diffusing section toward the outlet.

The gas turbine engine components, gas path walls and cooling holes described herein can be manufactured using one or more of a variety of different processes. These techniques provide each cooling hole with its own particular configuration and features, including, but not limited to, inlet, metering, transition, diffusion, outlet, upstream surface, downstream surface, lateral surface, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering section, transition, diffusing section and outlet cooling features may be formed prior to a coating application, after a first coating (e.g., a bond coat) is applied, or after a second or third (e.g., interlayer) coating process, or a final coating (e.g., environmental or thermal barrier) process. Depending on component type, cooling hole or passage location, repair requirements and other considerations, the diffusing section and outlet features may be located within a wall or substrate, within a thermal barrier coating or other coating layer applied to a wall or substrate, or combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering section, transition, outlet, diffusing section and other cooling features. For example, when a thermal barrier coat or other coating is applied to the second surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole, for example different laser and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

A component for a gas turbine engine can include a gas path wall having a first surface and a second surface. A cooling hole can extend through the gas path wall from an inlet in the first surface through a transition to an outlet in the second surface. Cusps can be formed on the transition.

The component of the preceding paragraph can optionally include, additionally and/or alternatively any, one or more of the following features, configurations and/or additional components:

the cusps can extend from the inlet along the cooling hole toward the outlet;

the cusps can terminate between the inlet and the outlet;

cross sectional area of the cooling hole can not increase from the inlet to the transition, and cross sectional area of the cooling hole can increase from the transition to the outlet;

one of the cusps can extend through the transition along a ridge that extends from the transition toward a trailing edge of the outlet;

two of the cusps can extend through the transition along two ridges that divide the cooling hole into three lobes;

a transition region can extend along a trailing edge of the outlet;

one of the lobes can terminate at the transition region;

the cooling hole can have a bicuspid cross section taken perpendicular to an axis of the cooling hole at a location between the inlet and the outlet, and the bicuspid cross section can have a ratio of semi-major to semi-minor axes of 3 or less;

the cooling hole can have a bicuspid cross section taken perpendicular to an axis of the cooling hole at a location between the inlet and the outlet, and the bicuspid cross section can have a concave upstream surface that extends toward an axis of the cooling hole between opposing side surfaces;

the cooling hole can have a cross section taken perpendicular to an axis of the cooling hole at a location between the inlet and the outlet, and the cross section can have a single cusp; and/or a gas turbine engine can include the component.

A cooling system for a gas turbine engine component can include a flow path wall having a first surface exposed to cooling fluid and a second surface exposed to working fluid flow. A cooling hole can extend through the flow path wall from an inlet in the first surface through a transition to an outlet in the second surface. A metering section can extend from the inlet to the transition. At least two longitudinal cusps can extend along the metering section from the inlet toward the transition. The longitudinal cusps can divide the metering section into lobes. A diffusing section can extend from the transition to the outlet.

The cooling system of the preceding paragraph can optionally include, additionally and/or alternatively any, one or more of the following features, configurations and/or additional components:

the longitudinal cusps can terminate at the transition;

one of the longitudinal cusps can extend through the transition along a longitudinal ridge that divides the diffusing section into lobes;

two longitudinal cusps can extend through the transition along two longitudinal ridges that divide the diffusing section into three lobes;

a transition region can extend from the longitudinal ridge to a trailing edge of the outlet, and the transition region can extend along substantially all of a transverse width of the trailing edge;

the transition can have a cross section with a single cusp;

the inlet can have an uncusped cross section with a continuously convex perimeter; and/or the cooling hole can have a bicuspid cross section at the transition and have an uncusped cross section at the inlet.

The invention claimed is:

1. A component for a gas turbine engine, the component comprising:
   a gas path wall having a first surface and a second surface;
   a cooling hole extending through the gas path wall from an inlet in the first surface through a transition to an outlet in the second surface; and
   cusps formed on the transition, wherein a single cusp extends from the inlet and diverges into two cusps between the inlet and the transition.

2. The component of claim 1, wherein a cross sectional area of the cooling hole does not increase from the inlet to the transition, and wherein a cross sectional area of the cooling hole increases from the transition to the outlet.

3. The component of claim 2, wherein one of the cusps extends through the transition along a ridge, the ridge extending from the transition toward a trailing edge of the outlet.

4. The component of claim 2, wherein two of the cusps extend through the transition along two ridges, the two ridges dividing the cooling hole into three lobes.

5. The component of claim 4, further comprising:
   a transition region extending along a trailing edge of the outlet.

6. The component of claim 5, wherein one of the lobes terminates at the transition region.

7. The component of claim 1, wherein the cooling hole has a bicuspid cross section taken perpendicular to an axis of the cooling hole at a location between the inlet and the outlet, the bicuspid cross section having a ratio of semi-major to semi-minor axes, the ratio being 3 or less.

8. The component of claim 1, wherein the cooling hole has a bicuspid cross section taken perpendicular to an axis of the cooling hole at a location between the inlet and the outlet, the bicuspid cross section having a concave upstream surface, the concave upstream surface extending toward an axis of the cooling hole between opposing side surfaces.

9. A gas turbine engine comprising the component of claim 1.

10. A cooling system for a gas turbine engine component, the cooling system comprising:
    a flow path wall having a first surface exposed to cooling fluid and a second surface exposed to working fluid flow;
    a cooling hole extending through the flow path wall from an inlet in the first surface through a transition to an outlet in the second surface;
    a metering section extending from the inlet to the transition;
    at least two longitudinal cusps extending along the metering section from the inlet toward the transition, wherein the at least two longitudinal cusps terminate at the transition, and
    a diffusing section extending from the transition to the outlet.

11. The cooling system of claim 10, wherein one of the longitudinal cusps extends through the transition along a longitudinal ridge, the longitudinal ridge dividing the diffusing section into lobes.

12. The cooling system of claim 10, wherein two longitudinal cusps extend through the transition along two longitudinal ridges, the two longitudinal ridges dividing the diffusing section into three lobes.

13. The cooling system of claim 12, further comprising:
    a transition region extending from the longitudinal ridge to a trailing edge of the outlet, the transition region extending along substantially all of a transverse width of the trailing edge.

14. The cooling system of claim 10, wherein two longitudinal cusps converge as they extend towards the transition.

15. A cooling system for a gas turbine engine component, the cooling system comprising:
    a flow path wall having a first surface exposed to cooling fluid and a second surface exposed to working fluid flow;
    a cooling hole extending through the flow path wall from an inlet in the first surface through a transition to an outlet in the second surface;
    a metering section extending from the inlet to the transition;
    at least two longitudinal cusps extending along the metering section from the inlet toward the transition, wherein the longitudinal cusps divide the metering section into lobes; and
    a diffusing section extending from the transition to the outlet, wherein the transition has a cross section with a single cusp.

16. A component for a gas turbine engine, the component comprising:
    a gas path wall having a first surface and a second surface;
    a cooling hole extending through the gas path wall from an inlet in the first surface through a transition to an outlet in the second surface; and
    cusps, wherein two cusps extend from the inlet and converge into one cusp at the transition.

* * * * *